United States Patent
Kouda et al.

(10) Patent No.: US 11,318,543 B2
(45) Date of Patent: May 3, 2022

(54) JIG SYSTEM WITH HYDRAULIC EXPANSION CLAMP MECHANISM

(71) Applicant: Jabil Circuit (Singapore) Pte. Ltd., Singapore (SG)

(72) Inventors: Yoshio Kouda, Wuxi (CN); Kai-En Huang, Wuxi (CN)

(73) Assignee: Jabil Circuit (Singapore) Pte. Ltd., Singapore (SG)

(*) Notice: Subject to any disclaimer, the term of this patent is extended or adjusted under 35 U.S.C. 154(b) by 16 days.

(21) Appl. No.: 17/030,990

(22) Filed: Sep. 24, 2020

(65) Prior Publication Data
US 2021/0094104 A1    Apr. 1, 2021

(30) Foreign Application Priority Data
Sep. 30, 2019  (CN) .......................... 201921662118.5

(51) Int. Cl.
| B23B 31/30 | (2006.01) |
| B33Y 80/00 | (2015.01) |
| B23Q 3/06  | (2006.01) |

(52) U.S. Cl.
CPC .......... *B23B 31/302* (2013.01); *B23B 31/305* (2013.01); *B23Q 3/061* (2013.01); *B33Y 80/00* (2014.12)

(58) Field of Classification Search
CPC ......... Y10T 279/1216; Y10T 279/1241; B23B 31/1172; B23B 31/1178; B23B 31/302; B23B 31/305; B29C 64/00; B23Q 3/082; B23Q 3/061; B33Y 80/00
See application file for complete search history.

(56) References Cited

U.S. PATENT DOCUMENTS

| 4,116,453  A  * | 9/1978  | Andre ............... B23B 31/16166 279/132 |
| 4,264,229  A  * | 4/1981  | Falk ...................... F16D 1/0805 192/85.13 |
| 5,388,487  A  * | 2/1995  | Danielsen ............... B23B 29/04 279/2.08 |
| 5,855,446  A  * | 1/1999  | Disborg .................. B27B 5/325 403/31 |
| 6,186,691  B1 * | 2/2001  | Rudolf-Bauer ....... E04B 1/6813 403/31 |
| 7,926,796  B2 * | 4/2011  | Clark ..................... B25B 5/065 269/22 |
| 10,226,825 B2 * | 3/2019  | Berg ....................... B23B 31/02 |
| 2019/0001420 A1* | 1/2019 | Teusch ............... B23B 31/1178 |
| 2021/0252609 A1* | 8/2021 | Schaperkotter ....... B24B 13/005 |

FOREIGN PATENT DOCUMENTS

EP            2422906 A1    2/2012

* cited by examiner

*Primary Examiner* — Chwen-Wei Su
(74) *Attorney, Agent, or Firm* — Young Basile Hanlon & MacFarlane, P.C.

(57) ABSTRACT

A jig system with hydraulic expansion clamp mechanism for clamping a work piece includes a plate that is manufactured integrally as one piece using three-dimensional printing. The plate is formed with an expansion chamber that is defined by a surrounding wall for allowing the work piece to extend therethrough, an inlet that is fluidly connected to a hydraulic source that supplies pressurized fluid, and a passage that is fluidly connected to the inlet and the expansion chamber. When pressurized fluid is supplied into the passage from the inlet, the expansion chamber is caused to expand and move the surrounding wall inwardly into contact with the work piece.

17 Claims, 4 Drawing Sheets

JIG SYSTEM WITH HYDRAULIC EXPANSION CLAMP MECHANISM

CROSS-REFERENCE TO RELATED APPLICATION

This application claims priority of Chinese Patent Application No. 201921662118.5, filed on Sep. 30, 2019.

FIELD

The disclosure relates to a jig system with a hydraulic expansion clamp mechanism.

BACKGROUND

FIG. 1 is a schematic view of a conventional jig system 100 for securing a number of work pieces 110. The jig system 100 may be operated with a feeding mechanism that is configured to feed the work pieces 110 along a Z-direction (as indicated by the arrow ZC in FIG. 1) through a number of through holes, respectively.

The jig system 100 further employs a number of screws 120 that can be moved toward the work pieces 110, respectively, so as to secure the work pieces 110.

It is noted that using the screws 120 to secure the work pieces 110 may not be ideal since each of the screws 120 typically is in contact with only a part of the respective one of the work pieces 110. In cases that the work pieces 110 are in specific shapes (e.g., a circular rod), the securing of the screws 120 may not be stable when the work pieces 110 are subjected to external forces from, for example, a machining process.

Additionally, it is desired for a jig system to have a lower lead time (i.e., a time between placement of an order for the jig system and the delivery of the same), and to be able to hold a work piece with a greater maximum length.

SUMMARY

One object of the disclosure is to provide a jig system with a hydraulic expansion clamp mechanism that can alleviate at least one of the drawbacks of the prior art.

According to one embodiment of the disclosure, a system with hydraulic expansion clamp mechanism for clamping a work piece rod comprises a plate that is manufactured integrally as one piece using three-dimensional (3D) printing.

The plate is formed with
  at least one expansion chamber that is defined by a surrounding wall for allowing the work piece to extend therethrough,
  an inlet that is fluidly connected to a hydraulic source that supplies pressurized fluid, and
  a passage that is fluidly connected to the inlet and the expansion chamber.

When pressurized fluid is supplied into the passage from the inlet, the expansion chamber is caused to expand and move the surrounding wall inwardly into contact with the work piece.

According to one embodiment of the disclosure, a jig system with hydraulic expansion clamp mechanism is for clamping a plurality of work pieces. The jig system includes a plate that is manufactured integrally as one piece using three-dimensional (3D) printing and that is formed with:
  a plurality of expansion chambers, each of the expansion chambers being defined by a surrounding wall for allowing one of the work pieces to extend therethrough;
  an inlet that is fluidly connected to a hydraulic source that supplies pressurized fluid; and
  a passage that is fluidly connected to the inlet and the expansion chambers.

When pressurized fluid is supplied into the passage from the inlet, each of the expansion chambers is caused to expand and move a corresponding one of the surrounding walls inwardly into contact with the corresponding one of the work pieces.

According to one embodiment of the disclosure, a jig system with hydraulic expansion clamp mechanism is for clamping a plurality of work pieces. The jig system includes a plate that is manufactured integrally as one piece using three-dimensional (3D) printing and that is formed with:
  a plurality of through holes each for allowing a corresponding one of the work pieces to extend therethrough;
  a plurality of expansion chambers, each of the expansion chambers being defined by a surrounding wall that surrounds a corresponding, one of the through holes; and
  a passage that is fluidly connected to each of the expansion chambers.

When pressurized fluid is supplied into the passage, each of the expansion chambers is caused to expand and move a corresponding one of the surroundings walls inwardly into contact with the corresponding one of the work pieces.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
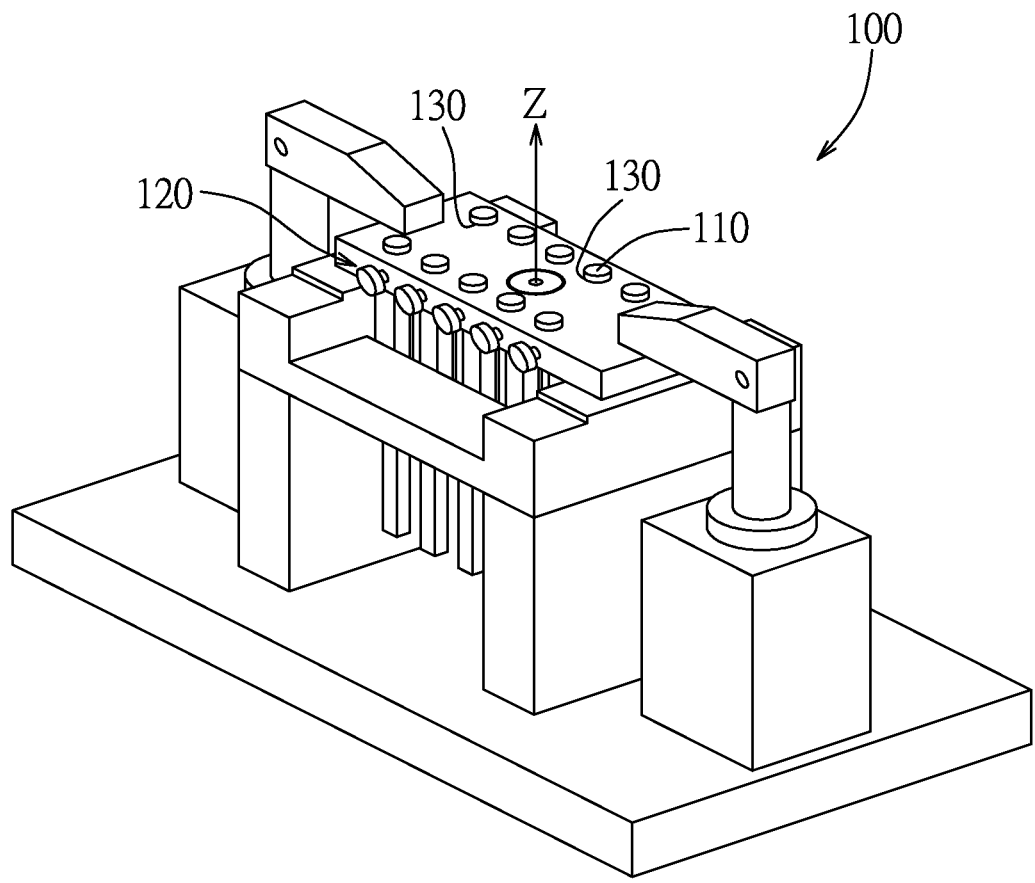
FIG. 1 is a schematic view of a conventional jig system for clamping and feeding a work piece.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
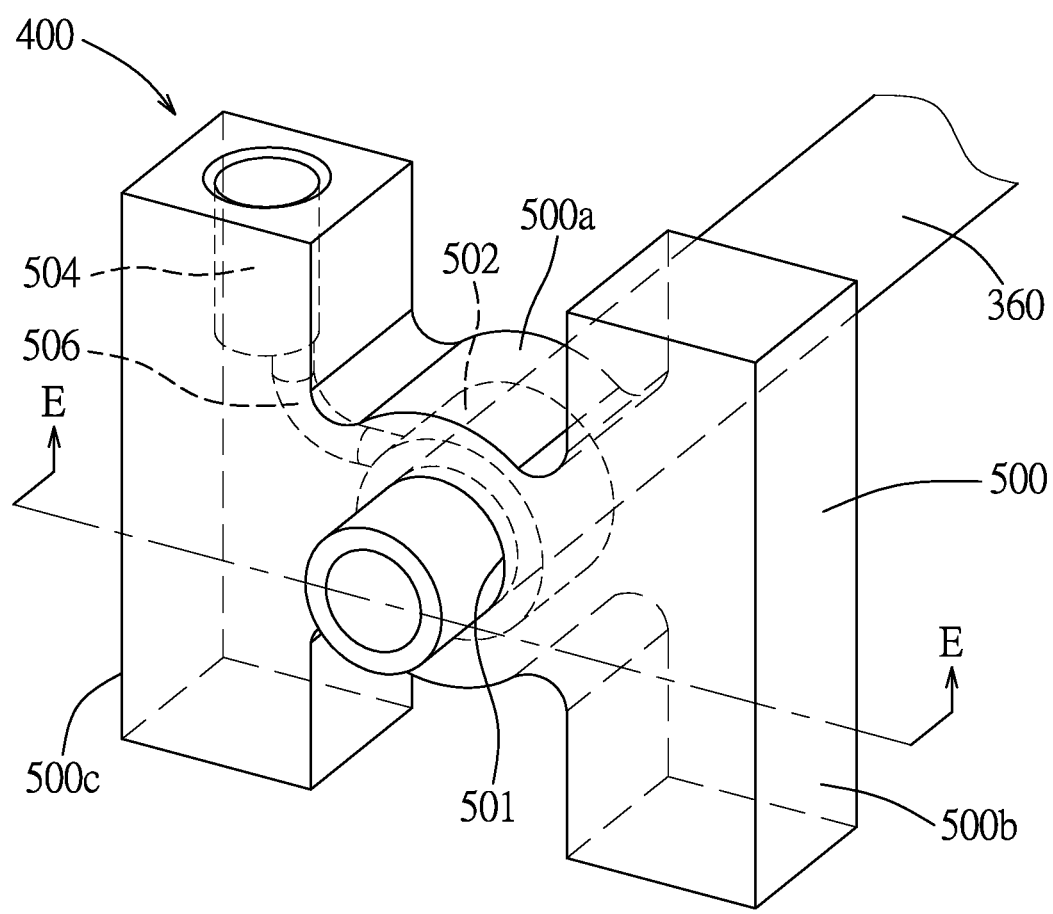
FIG. 2 is a perspective view of a jig system according to one embodiment of the disclosure.

FIG. 2 is a schematic view of a jig system 400 according to one embodiment of the disclosure. In this embodiment, the jig system 400 may be used in a computer numerical control (CNC) machine.

Figure 3:
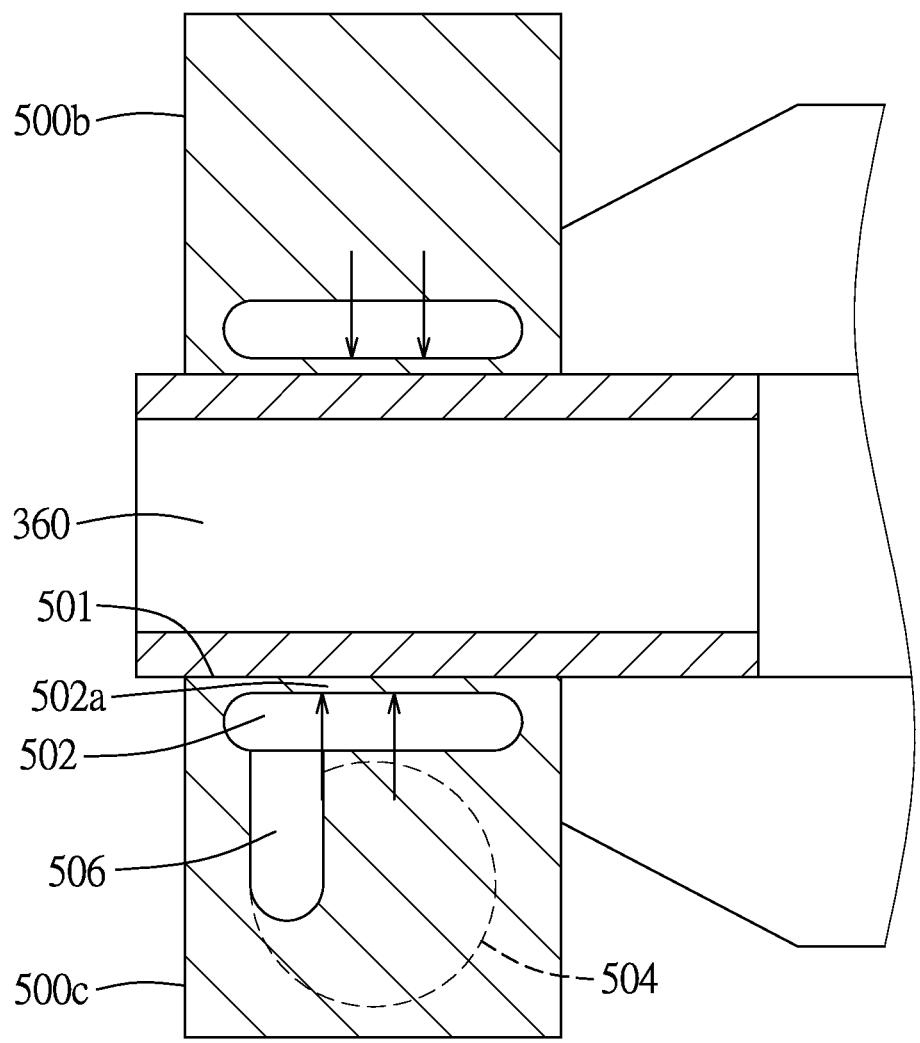
FIG. 3 is a sectional view of FIG. 2 taken along a dotted line E-E.

Referring to FIG. 2 and FIG. 3 (which is a sectional view of FIG. 2 taken along a dotted line E-E), in one embodiment, the jig system 400 includes a plate 500. The plate 500 is manufactured integrally as one piece using 3D metal printing and has a substantially H-shape with a connecting part 500a and two extending parts 500b, 500c extending from two ends of the connecting part 500a, respectively. The plate 500 is formed with a through hole 501 defined by a surrounding wall 502a for allowing a work piece 360 to extend there through, cylinder-shaped expansion chamber 502 adjacent to the surrounding wall 502a, an inlet 504, and a passage 506. In this embodiment, the inlet 504 is formed in one of the two extending parts 500c, and the passage 506 is formed in the connecting part 500a.

The surrounding wall 502a is, for example, a cylinder-shaped thin metal wall. The expansion chamber 502 is cylinder-shaped and surrounds the surrounding wall 502a. The inlet 504 is fluidly connected to a fluid source such as a hydraulic source (not shown) that supplies pressurized fluid, and is connected to a valve (not shown) that can be controlled to open or close. The passage 506 is fluidly connected to the inlet 504 and the expansion chamber 502. In this embodiment, the work piece 360 is a cylinder-shaped hollow rod. In use, the work piece 360 may be driven by a feeding mechanism to move, ending up with a segment of the work piece 360 moving through and protruding from the through hole 501.

When pressurized fluid is supplied to the passage 506 via the inlet 504, the pressurized fluid flows into the expansion chamber 502, which causes the expansion chamber 502 to expand, and the resulting hydraulic pressure of the pressurized fluid is applied to the surrounding wall 502a and may place the surrounding wall 502a in contact with the work piece 360, so that the work piece 360 is secured and clamped in the through hole 501. Due to the fact that from the perspective of the work piece 360, the hydraulic pressure is applied inward from all directions, the work piece 360 can be securely clamped by the surrounding wall 502a. It is noted that the surrounding wall 502a is formed with a uniform thickness, so as to be able to secure the work piece 360 with a more balanced inward force.

The protruded segment of the work piece 360 may be subjected to a machining process (e.g., milling, grinding, cutting, drilling, etc.) using external machines, and may be cutoff after the machining process is completed.

On the other hand, when it is desired that the work piece 360 be released, the valve may be switched to open, and as a result, the pressurized fluid flows out of the expansion chamber 502 and then out of the plate 500 through the inlet 504. As a result, the surrounding wall 502a is free from the hydraulic pressure of the pressurized fluid and is restored to its original, non-expanded state, and thus the work piece 360 that was clamped in the through hole 501 is released.

Figure 4:
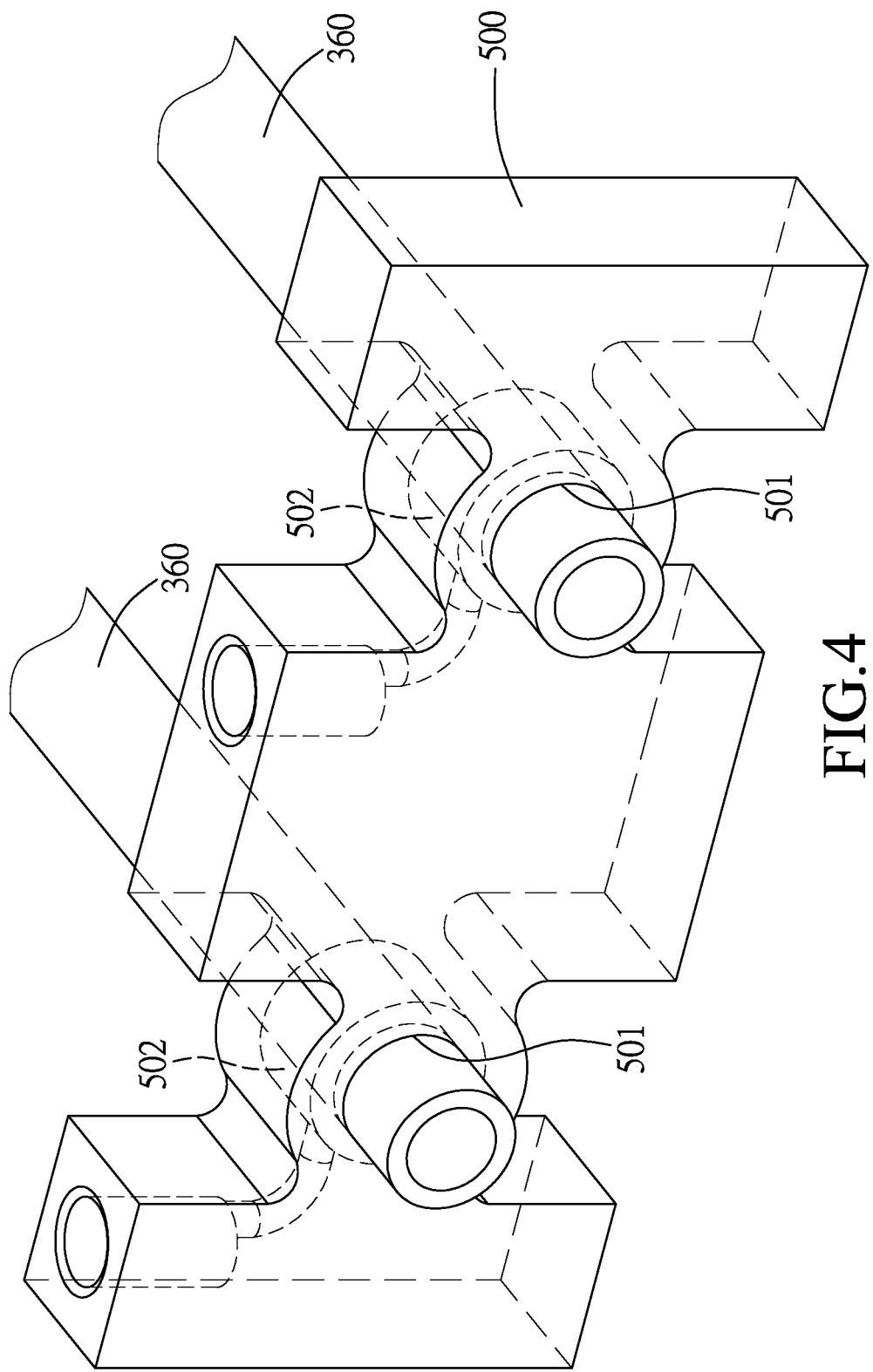
FIG. 4 is a perspective view of a jig system according to one embodiment of the disclosure.

Although one expansion chamber 502 and one surrounding wall 502a are formed in the embodiment, it is noted that in other embodiments, additional expansion chambers 502, surrounding walls 502a and through holes 501 may be formed, in which case the passage 506 would be fluidly connected to each of the expansion chambers 502. That is to say, in one embodiment as shown in FIG. 4, the jig system is for clamping a plurality of work pieces 360, the plate 500 is formed with a plurality of expansion chambers 502, and each of the expansion chambers 502 is defined by a surrounding wall 502a for allowing a corresponding one of the work pieces 360 to extend therethrough. In one embodiment, the plate 500 is further formed with a plurality of through holes 501, and each of the through holes 501 is for allowing a corresponding one of the work pieces 360 to extend therethrough.

In such a configuration, multiple work pieces 360 may be simultaneously fed to protrude respectively through the through holes 501, and be simultaneously clamped by the surrounding walls 502a, respectively.

To sum up, the embodiment of the disclosure provides a jig system with a hydraulic expansion clamp mechanism for clamping a work piece 360. Since the plate 500 of the jig system 400, which used to be multiple elements assembled together, is now manufactured integrally as one piece using 3D metal printing, a total number of components for building the jig system 400 may be significantly decreased, and a cost of manufacturing can be reduced as well. Also, this manner of manufacturing facilitates manufacturing of a more complicated structure of the jig system 400. Additionally, a lead time of the jig system 400 may also be reduced.

Additionally, the jig system 400 described in the disclosure employs a relatively simple design, and has a smaller size than conventional designs. As a result, the jig system 400 may be easier to fit in a CNC system, such as being secured by a clamping device of the CNC system, such as a clamping jaw shown in FIG. 3. Since the work piece 360 may be a component to be subjected to the machining process by the CNC system, the jig system 400 may be utilized to secure the work piece 360 for the CNC system.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirt and scope of the broadest interpretation so as to encompass all such modifications and equivalent arrangements.

What is claimed is:

1. A jig system with hydraulic expansion clamp mechanism for clamping a plurality of work pieces, comprising a plate that is manufactured integrally as one piece using three-dimensional (3D) printing;
   wherein said plate is formed with
      a plurality of expansion chambers, each of said expansion chambers being defined by one of a plurality of surrounding walls for allowing a corresponding one of the work pieces to extend therethrough,
      an inlet that is fluidly connected to a hydraulic source that supplies pressurized fluid, and
      a passage that is fluidly connected to the inlet and said expansion chambers; wherein when pressurized fluid is supplied into the passage from the inlet, said expansion chambers are caused to expand and move said surrounding walls inwardly into contact with the work pieces, and
   wherein said plate is further formed with a plurality of through holes, each of the through holes is for allowing a corresponding one of the work pieces to extend therethrough.

2. The jig system of claim 1, wherein at least one of said through holes is defined by a corresponding one of said surrounding walls, and said expansion chambers are adjacent to said corresponding one of surrounding walls.

3. The jig system of claim 1, wherein said at least one of surrounding walls is cylinder-shaped.

4. The jig system of claim 3, wherein said at least one of surrounding walls is formed with a uniform thickness.

5. The jig system of claim 1, wherein at least one of said expansion chambers are cylinder-shaped and surrounds said surrounding walls.

6. The jig system of claim 1, wherein said plate has a connecting part and two extending parts extending from two ends of the connecting part, respectively.

7. The jig system of claim 6, wherein said inlet is formed in one of said extending parts, and the passage is formed in said connecting part.

8. The jig system of claim 1, wherein said inlet is fluidly connected to a fluid source that supplies the pressurized fluid, and is connected to a valve that can be controlled to open or close.

9. The jig system of claim 8, wherein, when the valve is open, the pressurized fluid flows out of said expansion chambers and then out of said plate through said inlet, thereby freeing said plurality of surrounding walls from the hydraulic pressure of the pressurized fluid.

10. The jig system of claim 1, wherein the jig system is used in a computer numerical control (CNC) machine.

11. A jig system with hydraulic expansion clamp mechanism for clamping a plurality of work pieces, comprising a plate that is manufactured integrally as one piece using three-dimensional (3D) printing and that is formed with:
   a plurality of expansion chambers, each of said expansion chambers being defined by a surrounding wall for allowing one of the work pieces to extend therethrough; and
   a plurality of through holes, each of the through holes is for allowing a corresponding one of the work pieces to extend therethrough,
   wherein when pressurized fluid received via an inlet is supplied into a passage connected to said expansion chambers, each of said expansion chambers is caused to expand and move a corresponding one of said surrounding walls inwardly into contact with the corresponding one of the work pieces.

12. The jig system of claim 11, wherein each of said surrounding walls is cylinder-shaped and is formed with a uniform thickness.

13. The jig system of claim 11, wherein each of said expansion chambers is cylinder-shaped and surrounds a corresponding one of said surrounding walls.

14. The jig system of claim 11, wherein:
   said plate has a connecting part and two extending parts extending from two ends of said connecting part, respectively; and
   said inlet is formed in one of said extending parts, and said passage is formed in said connecting part.

15. A jig system with hydraulic expansion clamp mechanism for clamping a plurality of work pieces, comprising a plate that is manufactured integrally as one piece using three-dimensional (3D) printing and that is formed with:
   a plurality of through holes each for allowing a corresponding one of the work pieces to extend therethrough;
   a plurality of expansion chambers, each of said expansion chambers being defined by a surrounding wall that surrounds a corresponding one of said through holes; and
   a passage that is fluidly connected to each of said expansion chambers;
   wherein when pressurized fluid is supplied into said passage, each of said expansion chambers is caused to expand and move a corresponding one of said surroundings walls inwardly into contact with the corresponding one of the work pieces.

16. The jig system of claim 15, wherein each of said surrounding walls is cylinder-shaped and is formed with a uniform thickness.

17. The jig system of claim 15, wherein each of said expansion chambers is cylinder-shaped and surrounds a corresponding one of said surrounding walls.

\* \* \* \* \*